United States Patent [19]

Chemnitzer

[11] Patent Number: 4,819,599
[45] Date of Patent: Apr. 11, 1989

[54] DEVICE FOR CONTROLLING THE IGNITION TIMING OF AN INTERNAL COMBUSTION ENGINE

[75] Inventor: Eberhard Chemnitzer, Lehrensteinsfeld, Fed. Rep. of Germany

[73] Assignee: Audi AG, Fed. Rep. of Germany

[21] Appl. No.: 71,908

[22] Filed: Jul. 10, 1987

[30] Foreign Application Priority Data

Jul. 15, 1986 [DE] Fed. Rep. of Germany ....... 3623829

[51] Int. Cl.$^4$ .............................................. F02P 5/14
[52] U.S. Cl. ..................................... 123/425; 123/422
[58] Field of Search ....................... 123/425, 435, 422; 73/35

[56] References Cited

U.S. PATENT DOCUMENTS

| 4,596,217 | 6/1986 | Bonitz et al. | 123/425 |
| 4,625,692 | 12/1986 | Kashimura et al. | 123/425 |
| 4,640,251 | 2/1987 | Harada et al. | 123/425 |

FOREIGN PATENT DOCUMENTS

| 261673 | 11/1986 | Japan | 123/425 |
| 261671 | 11/1986 | Japan | 123/425 |

Primary Examiner—Tony M. Argenbright
Attorney, Agent, or Firm—Kane, Dalsimer, Sullivan, Kurucz, Eisele and Richard

[57] ABSTRACT

A system for controlling the ignition timing of an internal combustion engine comprises an anti-knock control device (7), which includes an evaluating circuit (8) and a control circuit (9). If rapid acceleration occurs the anti-knock control is automatically varied to provide a less pronounced effect than during steady-state operation. In one embodiment the knocking control is by-passed (arrow 12) or switched off, while another embodiment, parameters of the knocking control are varied and made less sensitive, i.e. towards greater knock frequency, whereby the knocking control has a less active effect.

10 Claims, 4 Drawing Sheets

DEVICE FOR CONTROLLING THE IGNITION TIMING OF AN INTERNAL COMBUSTION ENGINE

BACKGROUND OF THE INVENTION

This invention relates to a device for controlling automatically the ignition timing of an internal combustion engine in such a way as to reduce or eliminate "pre-ignition" or so-called "knocking". Such anti-knock devices will be referred to for convenience in this specification and in the attached claims as "knocking controls".

Devices for controlling ignition timing of an engine are known, in which the ignition timing is stored within maps, depending upon various parameters such engine speed in particular, and is adjusted according to the instantaneous running condition of the engine. These programmed ignition timing angles are "advanced" as far as possible in relation to the top dead center position of the engine in order to obtain effective running with high power, low fuel consumption and low emission of toxic substances. As a result, the "knocking limit" is nearly reached, with consequent danger of knocking combustion; i.e. pre-ignition and possible damage to the engine.

In order to be able to achieve effective operation close to the "knocking limit" but avoid damage to the engine, it is also known to incorporate a so-called knocking control in addition to the aforementioned map adjustment of the ignition timing. Such a knocking control means essentially comprises a knocking sensor for determining pressures or noises, an evaluating circuit connected thereto, a signal processing means for recognizing and distinguishing knocks as compared with other noises, and also a control circuit. The control circuit adjusts the spark advance by steps in the retarding direction, when knocks are detected. An adjustment of the ignition point away from the knocking limit consequently occurs with the aid of this knocking control, when knocks are detected. When knocks no longer occur, re-regulation or resetting of the ignition point occurs again in steps in the advancing direction, towards the knocking limit. The stepwise control provides that for each detected knock a certain retarding adjustment of the ignition point occurs and this is sustained for a certain programmed number of combustions or engine cycles. If a further knock occurs, a further retarding adjustment takes place, and if there is no further knock, re-regulation or an advancing step occurs again to shift the ignition point back towards the knocking limit, until a knock is once again detected or the pre-programmed value in the map is obtained.

The control system described above continues to operate in the same way when engine acceleration occurs. As is well-known knocking frequently occurs during acceleration and with load variations which are associated therewith, and these are sensed by the knocking control means and can lead to considerable retarding adjustments of the ignition point. The result of this, however, is that the engine is operated less effectively, with lower power, higher fuel consumption and higher emissions of toxic substances. However, particularly under acceleration conditions, it is disadvantageous if the potential engine power is reduced by retarding the ignition point, as the active security of the vehicle in traffic is reduced.

SUMMARY OF THE INVENTION

Thus it is an object of the invention to provide an improved system for controlling the ignition timing of a vehicle engine, in such a way that the engine is operated more effectively during acceleration conditions especially rapid acceleration.

Broadly stated the invention consists in apparatus for controlling the ignition timing of an internal combustion engine, including a first device for establishing the normal ignition timing of the engine in dependence upon engine and/or vehicle and/or environmental parameters, a second device acting as a knocking control means for preventing or minimising knocking of the engine when running, which comprises a knocking sensor, a signal processing means connected thereto for recognizing knocking when running, a control circuit arranged to provide stepped retarding adjustments of the ignition point in relation to the normal stipulated ignition point when knocking occurs during running, and stepped resetting advancements, and including a third device for recognizing an acceleration state or an increase in engine speed per unit time $dn/dt$ where n indicates the speed, and which in the event of certain acceleration values where $dn/dt$ is equal to or exceeds a threshold value $x_n$ acts on the knocking control so as to affect this less actively than during the steady-state operation.

In the control apparatus of the invention the "speed gradient" or acceleration value is compared with a threshold value and if this threshold value is exceeded the knocking control is so influenced that the ignition point is shifted away from the knocking limit to a lesser extent than in steady-state operation. This is based on the appreciation that under rapid acceleration conditions an adjustment of the ignition point in the retard direction is not necessary or is necessary only to a lesser extent, because the engine conditions do not remain constant and therefore the engine temperatures do not rise uncontrollably as a result of occasional knocks. For this reason, no damage can be caused.

Better driving powers with great security in traffic and lower fuel consumption and also lower emissions are advantageously achieved by this means.

According to a preferred feature of the invention in the case of rapid acceleration, the third device of the control apparatus deactivates the knocking control means completely so that the engine is running with the ignition timing of the map only.

Elimination of the knocking control is possible at various different points in the control system such as for example by isolating the knocking sensor, or switching away the already evaluated signal after the knocking recognition switching off the control circuit connected thereto, or off the microcomputer used for this. In order to reduce time delays in switching, it has proven to be advantageous to allow the knocking control to become inactive by avoiding or by-passing the evaluation and control circuit.

As the existing control and switching operations likewise have to be carried out rapidly because of the rapid variations in engine speed, it is preferred that the apparatus should determine the effective engine speed gradients within very small time intervals immediately before the changeover switching takes effect.

It may be advantageous to make the threshold value for switching off, or less active switching, of the knocking control variable dependent upon the speed, or to leave the knocking control running normally in certain speed ranges and/or gears. Matching to specific engine running data, such as temperature behaviour, cylinder fill (charge) etc., can be effected in this way. It may, for example, be advantageous because of the alleviation of noise, to allow the knocking control to be fully effective at lower speeds in the event of acceleration also. Furthermore, it may be advantageous to allow the knocking control to be fully effective also at high speeds, since at these high speeds problems may possibly occur from distortion of the knocking recognition because of additional noises, and such operation is in general safer for the engine as a result.

The programmed threshold value or maintenance of the normal knocking control can in some cases be made dependent on the vehicle transmission reduction ratio, i.e. the selected gear engaged. With this arrangement it is possible to achieve an extra fine tuning, and also to take into account the varied load states of the engine with the same speeds, but with different gears.

The air intake temperature or ambient atmospheric temperature can also be considered as a parameter for the condition of switching-over or by-passing of the knocking control, in order to obtain a further refinement of the control. Above a certain temperature threshold the knocking control should remain effective in the normal way in order to improve security.

At low speeds and high load conditions it is known for the ignition point to be retarded suddenly in order to prevent knocking. This action should also continue if possible even if the knocking control is made less active or is completely cut-off, in order to maintain optimum comfort.

In some embodiments of the invention the knocking control for rapid acceleration conditions is not completely cut off, but a greater frequency of knocking is permitted, as compared with steady-state operation. This is achieved by effective knocking control parameters being varied in the direction of being more insensitive. With this type of control, a situation is brought about such that with rapid acceleration conditions the ignition point is not regulated too far and—as mentioned herein before—unnecessarily, away from the map values, and hence from the knocking limit, and therefore does not lead to less effective engine operation.

This can be achieved in such a way that the retarding adjustment steps, or the step height per knocking occurrence, are made smaller for rapid acceleration conditions than with steady-state running. As a result, regulation away from the map values occurs only to a slight extent in the event of knocks, so that resetting of the ignition to the predesigned value can also take place very rapidly after the acceleration period.

The re-regulation or re-setting of the ignition to the precalculated map values, can be accelerated as compared with the steady-state operation by making the resetting step larger when there are rapid acceleration conditions than in steady-state operation. A similar effect can be obtained in that the advancing adjustment step for the ignition (i.e. smaller step width) takes place over a smaller number of ignitions than for steady-state operation.

Normally the retarding adjustment is limited by the knocking control to a maximum value.

If this limit should be constantly exceeded, i.e. if knocks continue to occur in spite of the retarding adjustment by the knocking control, e.g. when an unsuitable fuel is used, the apparatus of the invention may indicate this by a so-called "knocking light". The driver is thus demanded to drive within a lower load range. The maximum retarding adjustment during acceleration is preferably limited to a threshold value which is lower than in steady-state operation. As a result, the knocking control is generally regulated not too far away from the optimum map values. If permitted knocks nevertheless occur, the knocking light shall not react.

A further possibility of making less active the knocking control at rapid acceleration conditions provides that the knocking recognition threshold will be programmed with a larger value i.e. less sensitive than in steady-state operation, so that fewer knocks are detected from the outset and at the same time the knocking control is regulated less far away from the map values.

The controls system of the invention can be used not only with a cylinder-selective but also with a non-cylinder-selective knocking control.

BRIEF DESCRIPTION OF THE DRAWINGS

The invention may be performed in various ways and a number of different embodiments will now be described by way of example with reference to the accompanying drawings, in which.

DETAILED DESCRIPTION OF THE INVENTION

Figure 1:
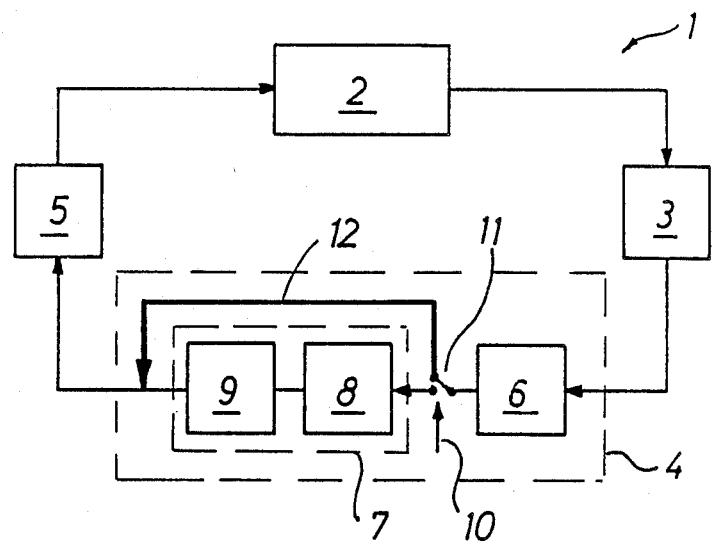
FIG. 1 is a diagram of an anti-knock control according to the invention.

FIG. 1 illustrates a control circuit 1 for an anti-knocking control, showing the engine 2 included in a control circuit, a "knocking sensor" 3 for picking up knocking vibrations, an electronic control unit 4 and a final control element in the form of an ignition output timer 5 which delivers a controlled variable for the ignition timing.

The electronic control unit 4 includes a module for the electronic ignition adjustment 6 and the components of a knocking controller 7, which comprises an evaluating circuit 8 and an actual control circuit 9. The arrow 10 is intended to indicate that when rapid accelerations are detected, a changeover switch 11 is actuated in such a way that the knocking controller 7 is by-passed (see by-pass arrow 12).

Figure 2:
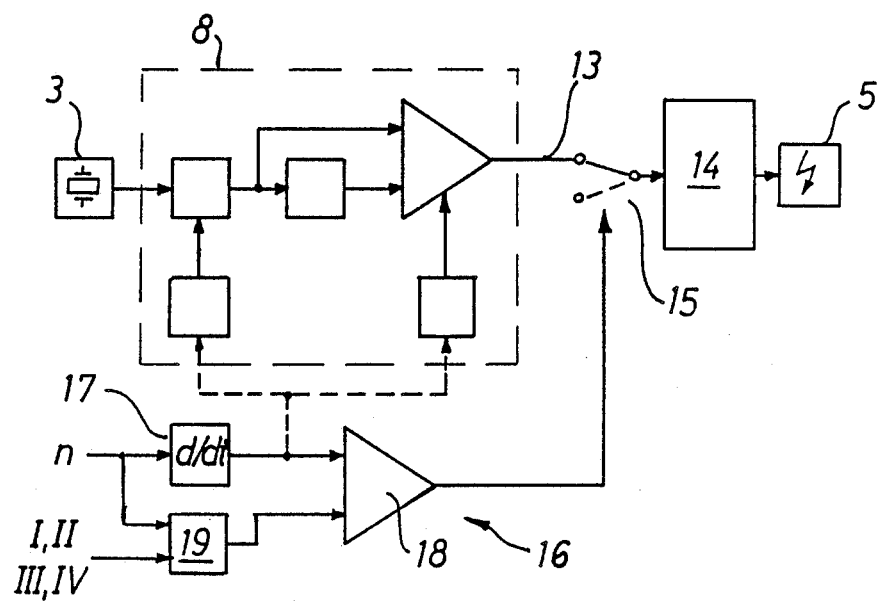
FIG. 2 is a general circuit diagram of an anti-knock control according to the invention.

FIG. 2 illustrates diagrammatically another solution using a modified circuit arrangement (similar components being identified by the same reference numerals as in FIG. 1). The knocking sensor 3 is connected to the signal-processing and evaluating circuit 8, the components of which are known 'per se' and do not require detailed description. The knocking data signal appears at the output 13 of the circuit 8 whenever knocking occurs. This signal, in normal conventional knocking controls which are superimposed on the map control for the ignition timing, is passed to a microprocessor 14, which acts both for the map control and also the knocking control. The ignition output stage 5 is connected thereto.

Between the circuit 8 and the microprocessor 14 is arranged a change-over switch 15, actuated by a changeover switching unit 16. This changeover switching unit 16 includes a differentiating step 17, in which the engine "speed gradient" dn/dt is calculated from the sensed speed value "n" in order to recognize a predetermined acceleration level in revolutions per second (r.p.s.). This speed gradient signal passes to a comparator 18, in which it is compared with a "threshold" value $x_n$, and actuates the change-over switch 15 if the threshold value is exceeded.

The height of the threshold value $x_n$ is defined in a threshold setting component 19 in dependence upon the sensed speed and the particular gear engaged.

In the circuit of FIG. 2 the "engine knocking" signal is switched off at 15 only just before the microprocessor 14. It is possible however to eliminate or disconnect the "engine knocking" signal further upstream of the microprocessor 14, by disconnecting the knocking sensor 3 for example. All such possibilities are intended to be covered by the by-pass arrow 12 shown in the diagram of FIG. 1.

Figure 3:
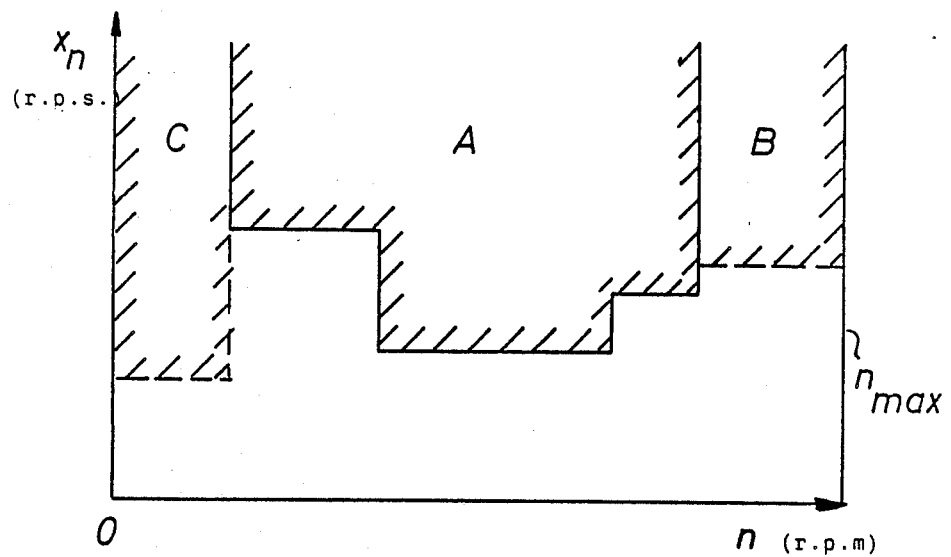
FIG. 3 is a diagram illustrating different threshold values dependent on speed.
Figure 4:
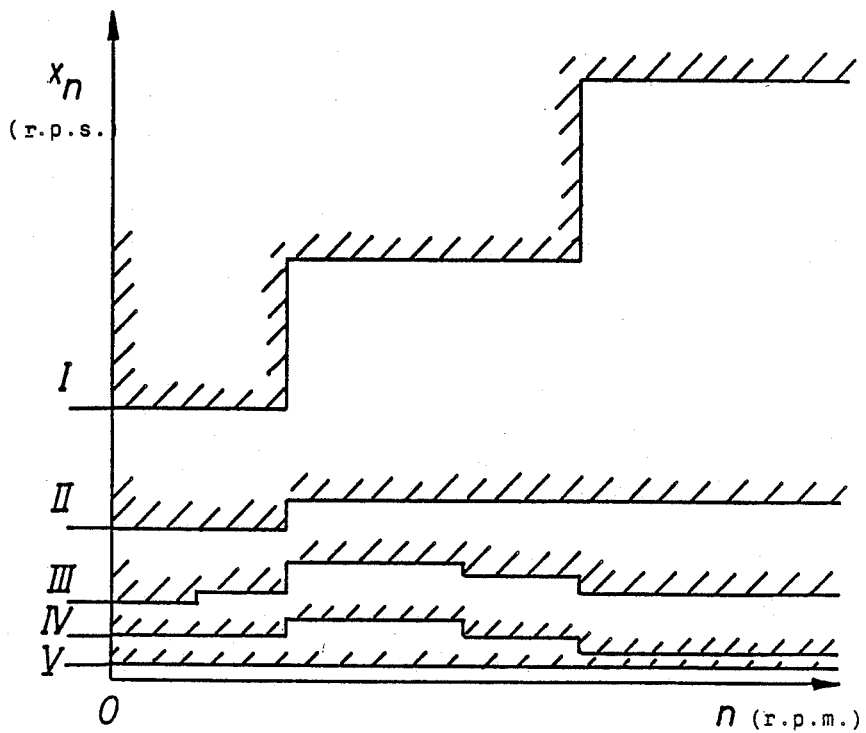
FIG. 4 is a diagram illustrating different threshold values dependent on speed with different gears engaged.

The function of the circuits of FIG. 1 and FIG. 2 may be better understood in conjunction with FIGS. 3 and 4.

In the changeover switching unit 16 it is determined by means of the comparator 18 whether the speed gradient is larger than the threshold value $x_n$ where the size of $x_n$ may be dependent on further parameters. In the event of rapid acceleration exceeding the threshold limit, the connection from the circuit 8 to the microcomputer 14 is disconnected by the switch 15. As a result, the microprocessor no longer receives any knocking information signals during such an acceleration phase, and accordingly does not produce any retarding adjustment signals, the ignition timing being determined according to the pre-selected stored map programme.

The way in which the threshold value $x_n$ may depend on engine speed 'n' is illustrated in FIG. 3. In a mean speed range A the knocking control becomes inactive (shaded section) when the sensed acceleration exceeds a variable acceleration threshold value $x_n$. At high speeds within the range B and at low speeds within the range C, the changeover switching unit 16 may be made completely inactive, for example to alleviate noise or for reasons of engine safety.

In one specific embodiment using a control system as illustrated in FIG. 2, control of the acceleration threshold level is effected only according to the sensed speed (i.e. only the upper arrow is put to threshold level setting component 19). For a further refinement of the control and to take into account varying load conditions, it is advantageous also to introduce data concerning the selected gear to determine the threshold value (i.e. using the lower input arrow on component 19). A corresponding acceleration threshold diagram is shown in FIG. 4, in which the five lines represent the threshold limits at different speeds for the activation or non-activation of the knocking control when one of the gears I to V is selected, the knocking control being inactive in the shaded area above the lines and active below them. It will be appreciated that in higher gears the threshold value is lower. In this system also lower speed ranges and upper speed ranges may be exempted completely, in a similar way to the FIG. 3 example, so that the knocking control will be in permanent operation.

Figure 5:
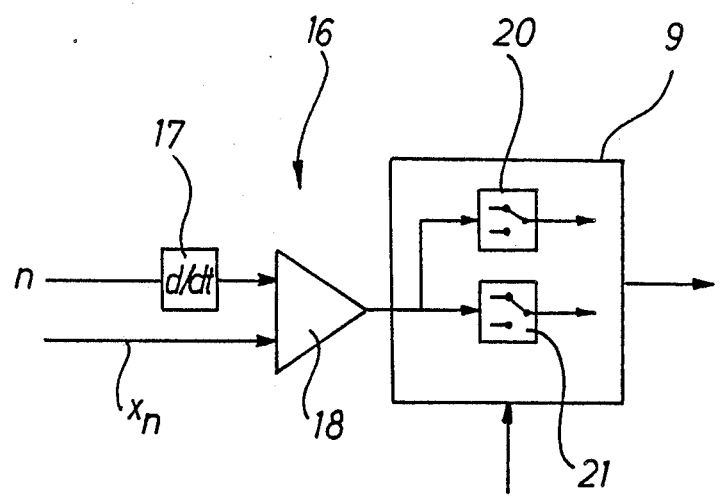
FIG. 5 is a diagrammatic illustration of a control module with changeover switching for use with the invention.

In the further modified example illustrated in the circuit diagram of FIG. 5, the knocking control is not actually by-passed, switched off or made inactive as shown in FIG. 1 or FIG. 2, but the control parameters are varied to produce a weaker or less pronounced effect, the knocking control being sustained but at this modified level.

In FIG. 5 the framed block is intended to illustrate the control circuit 9, but in this case as already stated, neither the switch 11 nor the by-pass arrow 12 of FIG. 1 are present. In this example the differentiator 17 produces a speed gradient or acceleration signal as one input to the comparator 18 and the other input is the threshold acceleration limit $x_n$. A changeover switching unit 16 recognises when the acceleration exceeds the limit, but in this case acts directly on the control circuit 9. Here, parameters are varied or switched over, as indicated by the switching circuit components 20 and 21. The circuit component 20, for example, may be responsible for the "step height", and the component 21 responsible for the "step width" of the stepped control means of FIG. 6. Alternatively the circuit components 20, 21, may be designed to be capable of switching over to different step heights and step widths.

Figure 6:
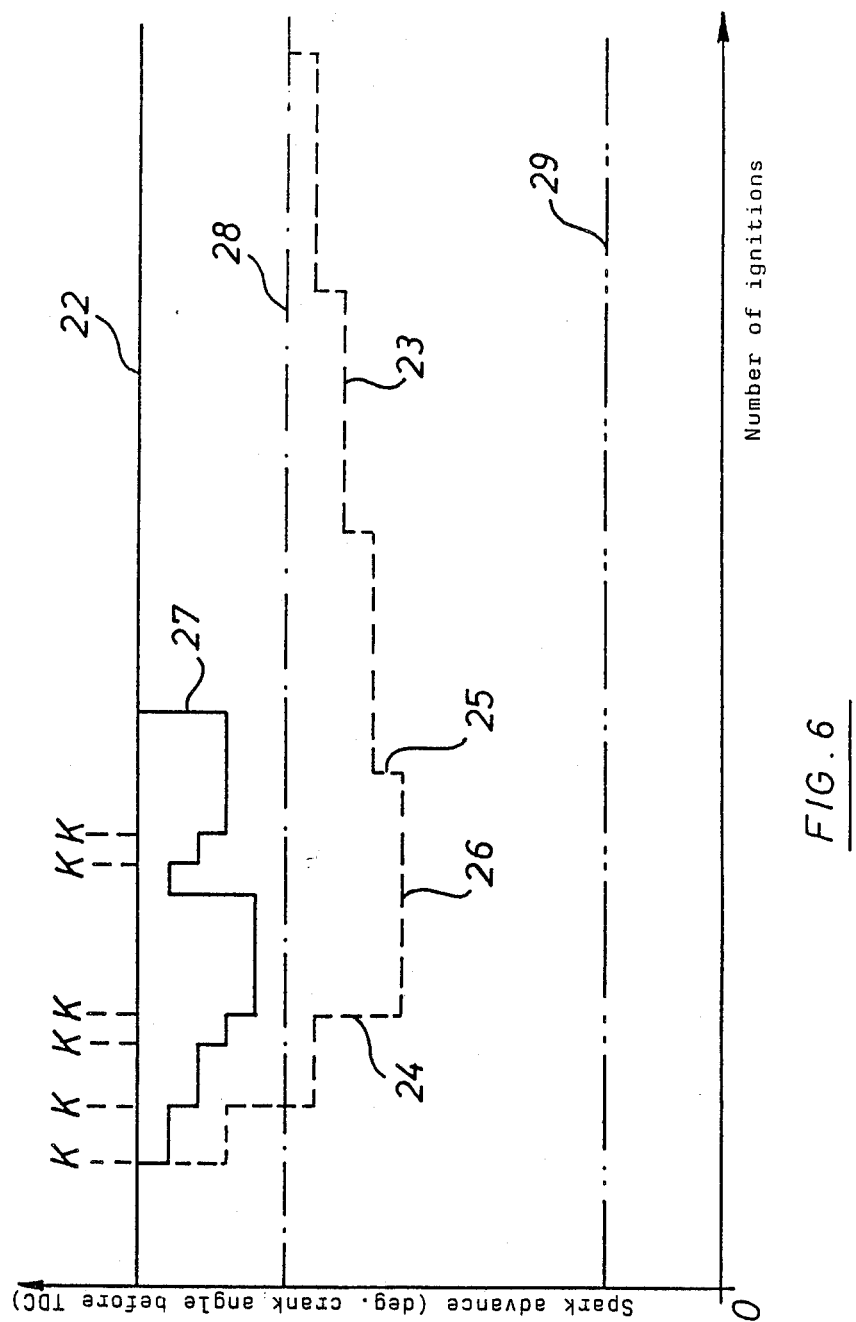
FIG. 6 is a diagram illustrating stepped retarding adjustment of the spark advance.

A knocking control system designed in accordance with the second specific embodiment of FIG. 5 is illustrated in FIG. 6. The line 22 indicates the standard ignition advance programmed in the map, from which the ignition point has to be adjusted in the retarding direction if knocking occurs. The stepped line 23 (shown with dashes) represents the ignition timing as carried out during steady-state running if knocking occurs, there being a knock at each of the points K. It can be seen that a comparatively large retarding adjustment (step height 24) is performed at each knock, so that a large overall retarding adjustment is obtained. Moreover, the advancing adjustment step (step height 25) is comparatively small and the "step width" 26 (i.e. the time between successive steps) is comparatively large The overall result is to provide a slow-acting control with a large control stroke, which obviously requires a long time to reach again the level of the programmed ignition point (line 22).

The invention however provides for switching over to other control parameters in the event of rapid acceleration conditions, whereby in the event of acceleration a control algorithm as per the stepped line 27 is produced It can be seen that here the retarding adjustment steps are smaller and the advancing adjustment steps larger than by comparison with the control algorithm as shown by line 23 for steady-state running. Furthermore, the retention time, i.e. the step width, is smaller The overall result is a control system which in the event of acceleration, in spite of repeated knocks, regulates less far away from the programmed ignition point (line 22) and returns considerably quicker to this ignition point thus providing more effective engine operation.

In FIG. 6 the horizontal line 28 denotes the limit to retarding adjustment for the acceleration operation, i.e. no retarding adjustment is possible beyond this line during acceleration, even if there should be further knocks. Likewise the line 29 indicates a maximum or limit to retarding adjustment applied during steady-state operation. The two limits for maximum retarding adjustment are also changed over by the components 20, 21.

To summarise, the knocking control system of the invention controls the ignition timing in such a way as to achieve more effective running of the engine and the vehicle, with improved drive, lower fuel consumption, lower toxic exhaust emissions and greater security in traffic, even when rapid acceleration occurs.

What is claimed is:

1. Apparatus for controlling the ignition timing of an internal combustion engine, including a first device for establishing the normal ignition timing of the engine independence upon factors comprising vehicle parameters, a second device acting as a knocking control means for preventing or minimizing knocking of the engine when running, which comprises a knocking sensor, a signal processing means connected thereto for recognizing knocking, a control circuit arranged to provide stepped retarding adjustments of the ignition point in relation to the normal stipulated ignition point when knocking occurs and stepped resetting advancement, and including a third device for recognizing an acceleration state or an increase in engine speed per unit time dn/dt where n indicates the speed, and which in the event of certain acceleration values where dn/dt is equal to or exceeds a threshold value $x_n$ acts on the knocking control so as to effect this less actively than during steady-state operation in which the acceleration threshold value at which the acceleration device takes effect is of variable height depending upon the speed.

2. Apparatus according to claim 1, in which the accelerator threshold value is dependent upon the vehicle transmission reduction ratio.

3. Apparatus according to claim 1, in which certain speed ranges or transmission reduction ratios are exempt from cancellation by the third acceleration sensing unit.

4. Apparatus for controlling the ignition timing of an internal combustion engine, including a first device for establishing the normal ignition timing of the engine in dependence upon factors comprising vehicle parameters, a second device acting as a knocking control means for preventing or minimizing knocking of the engine when running, which comprises a knocking sensor, a signal processing means connected thereto for recognizing knocking, a control circuit arranged to provide stepped retarding adjustment of the ignition point in relation to the normal stipulated ignition point when knocking occurs and stepped resetting advancement, and including a third device for recognizing an acceleration state or an increase in engine speed per unit time dn/dt where n indicates the speed, and which in the event of certain acceleration values where dn/dt is equal to or exceeds a threshold value xn acts on the knocking control so as to effect this less actively than during steady-state operation, in which the switching action of the third device occurs only below a certain temperature threshold value of the air intake temperature, whereas the knocking control is normally carried out at higher temperatures.

5. Apparatus for controlling the ignition timing of an internal combustion engine, including a first device for establishing the normal ignition timing of the engine in dependence upon factors comprising vehicle parameters, a second device acting as a knocking control means for preventing or minimizing knocking of the engine when running, which comprises a knocking sensor, a signal processing means connected thereto for recognizing knocking, a control circuit arranged to provide stepped retarding adjustments of the ignition point in relation to the normal stipulated ignition point when knocking occurs and stepped resetting advancement, and including a third device for recognizing an acceleration state or an increase in engine speed per unit time dn/dt where n indicates the speed, and which in the event of certain acceleration values where dn/dt is equal to or exceeds a threshold value $x_n$ acts on the knocking control so as to effect this less actively than during steady-state operation in which a sudden retarding adjustment at low speed and high load variation is maintained even when the knocking control is less actively controlled.

6. Apparatus for controlling the ignition timing of an internal combustion engine, including a first device for establishing their normal ignition timing of the engine in dependence upon factors comprising vehicle parameters, a second device acting as knocking control means for preventing or minimizing knocking of the engine when running, which comprises a knocking sensor, a signal processing means connected thereto for recognizing knocking, a control circuit arranged to provide for retarding adjustment steps for the ignition point which are less for each knocking incident occurrence when acceleration occurs than in steady-state operation and to therefore provide stepped retarding adjustments of the ignition point in relation to the normal stipulated ignition point when knocking occurs and stepped resetting advancement, and including a third device for recognizing an acceleration state or an increase in engine speed per unit time dn/dt where n indicates the speed, and which in the event of certain acceleration values where dn/dt is equal to or exceeds a threshold value xn acts on the knocking control so as to effect this less actively than during steady-state operation, wherein parameter of the knocking control which are varied by the third device in the direction of being more insensitive, to allow greater frequency or knocking.

7. Apparatus according to claim 6, in which the control circuit provides resetting advancing adjustment steps which are larger when acceleration occurs than in steady-state operation.

8. Apparatus according to claim 6, in which the control circuit is arranged to provide that the number of combustions occurring before each ignition advancing adjustment step is smaller when acceleration occurs than in steady-state operation.

9. Apparatus according to claim 6, in which the maximum retarding adjustment of the ignition point is smaller when acceleration occurs than in steady-state operation.

10. Apparatus for controlling the ignition timing of an internal combustion engine, including a first device for establishing the normal ignition timing of the engine in dependence upon factors comprising vehicle parameters, a second device acting as a knocking control means for preventing or minimizing knocking of the engine when running, which comprises a knocking sensor, a signal processing means connected thereto for recognizing knocking, a control circuit arranged to provide stepped retarding adjustments of the ignition point in relation to the normal stipulated ignition point when knocking occurs and stepped resetting advancement, and including a third device for recognizing an acceleration state or an increase in engine speed per unit time dn/dt where n indicates the speed, and which in the event of certain acceleration values where dn/dt is equal to or exceeds a threshold value $x_n$ acts on the knocking control so as to effect this less actively than during steady-state operation, in which the switching action of the third device occurs only below a certain temperature threshold value of the outside temperature whereas the knocking control is normally carried out at higher temperatures.

* * * * *